United States Patent [19]
Martin et al.

[11] Patent Number: 5,771,036
[45] Date of Patent: *Jun. 23, 1998

[54] CONFERENCING SYSTEM WITH REMOTE OBJECT DISPLAY AND CURSOR SHADOW

[75] Inventors: Rocco Martin, Hillsboro; Roger Ray, Portland, both of Oreg.

[73] Assignee: Intel Corporation, Santa Clara, Calif.

[21] Appl. No.: 747,071

[22] Filed: Nov. 8, 1996

[*] Notice: The term of this patent shall not extend beyond the expiration date of Pat. No. 5,655,066.

Related U.S. Application Data

[63] Continuation of Ser. No. 584,999, Jan. 11, 1996, Pat. No. 5,655,066, which is a continuation of Ser. No. 130,120, Sep. 30, 1993, abandoned.

[51] Int. Cl.⁶ .................................................... G06F 3/00
[52] U.S. Cl. ...................... 345/145; 345/349; 345/352; 345/332
[58] Field of Search .................................. 345/326–358, 345/145–146, 902, 427, 426

[56] References Cited

U.S. PATENT DOCUMENTS

| | | | |
|---|---|---|---|
| 4,974,173 | 11/1990 | Stefik et al. | 364/521 |
| 5,008,853 | 4/1991 | Bly et al. | 364/900 |
| 5,220,657 | 6/1993 | Bly et al. | 395/425 |
| 5,241,625 | 8/1993 | Epard et al. | 395/163 |
| 5,264,836 | 11/1993 | Rubin | 395/355 X |
| 5,335,323 | 8/1994 | Kolnick | 395/164 |
| 5,388,196 | 2/1995 | Pajak et al. | 395/153 |
| 5,528,735 | 6/1996 | Strasnick et al. | 395/127 |
| 5,555,354 | 9/1996 | Strasnick et al. | 395/127 |

FOREIGN PATENT DOCUMENTS 0480859  9/1991  European Pat. Off. .

Primary Examiner—John E. Breene
Attorney, Agent, or Firm—Blakely, Sokoloff, Taylor & Zafman

[57] ABSTRACT

An improved method and apparatus for remotely displaying cursor and tool operation in a conferencing system can be used for manipulating a remote cursor in a computer conferencing system, the computer conferencing system including a first participant coupled to a second participant via a communication medium.

13 Claims, 16 Drawing Sheets

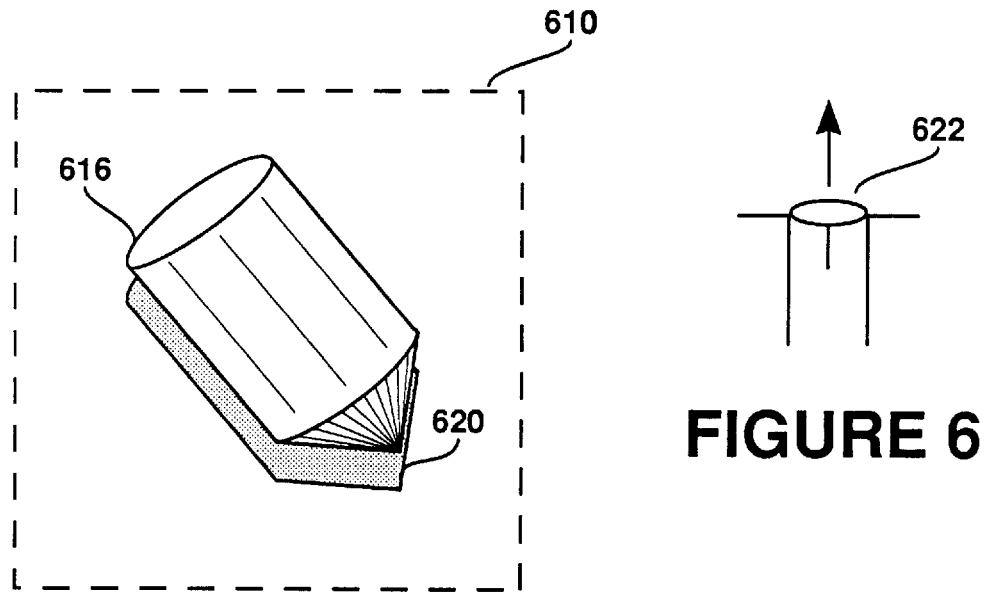
FIGURE 6a
FIGURE 6b
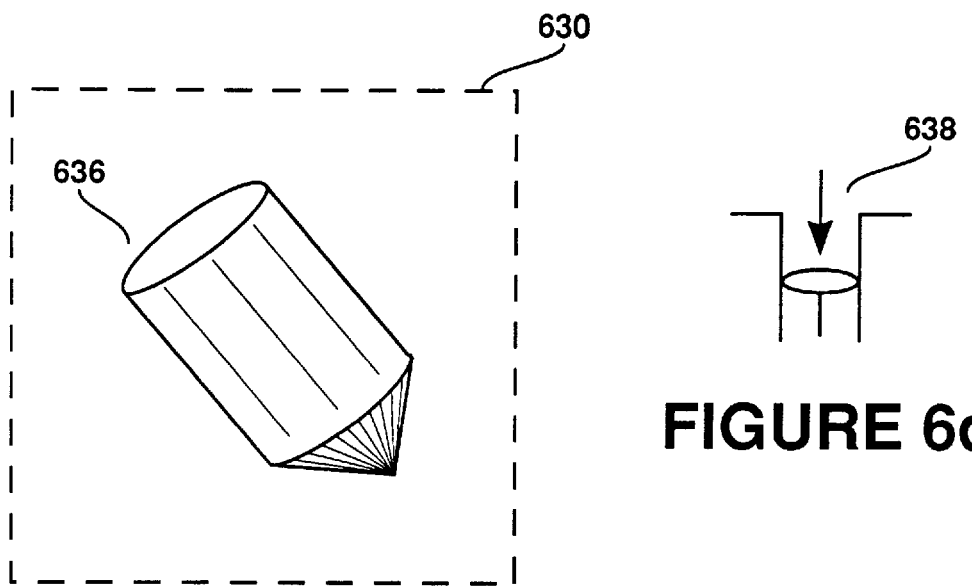
FIGURE 6c
FIGURE 6d

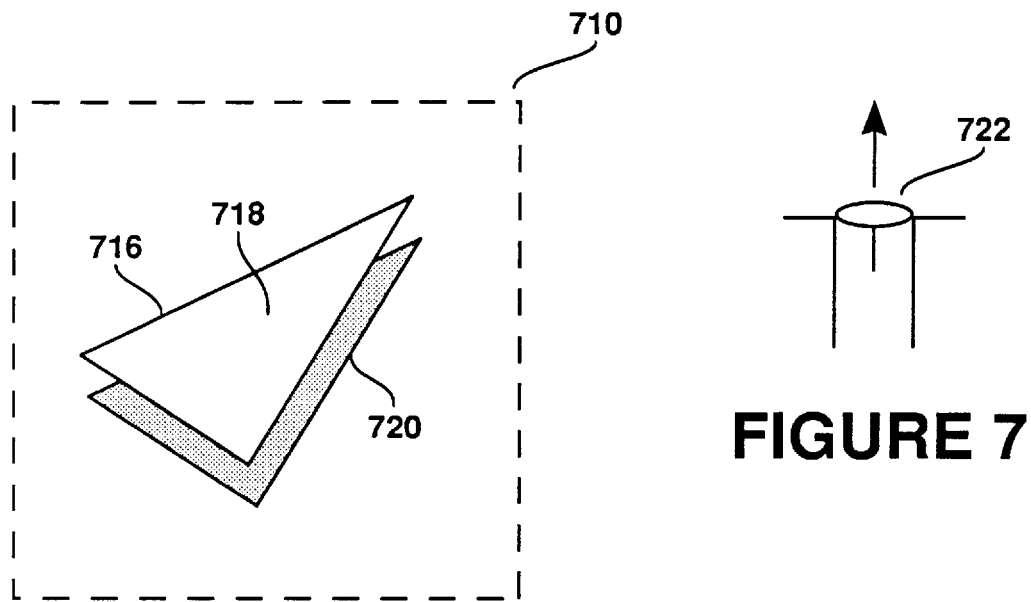
FIGURE 7a
FIGURE 7b
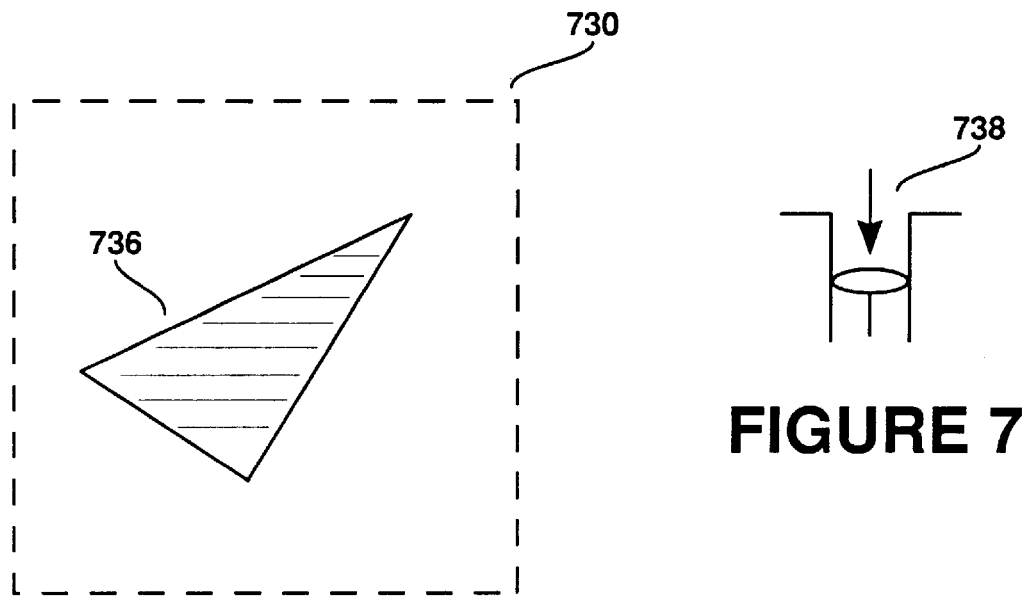
FIGURE 7c
FIGURE 7d

CONFERENCING SYSTEM WITH REMOTE OBJECT DISPLAY AND CURSOR SHADOW

This is a continuation of application Ser. No. 08/584,999, filed Jan. 11, 1996, now U.S. Pat. No. 5,655,066, which is a continuation of application Ser. No. 08/130,120, filed Sep. 30, 1993 abandoned.

BACKGROUND OF THE INVENTION

1. Field of the Invention

The present invention relates to the field of networked computer systems. Specifically, the present invention relates to the field of displaying objects and cursor movements among a plurality of networked users.

2. Description of Related Art

A set of personal computers interconnected on a network can be effectively used as a conferencing system. In such a system, each conference participant comprises a personal computer user having a computer, a display screen, a computer network interface, and typically a mouse or cursor movement device. Conference participants are linked together over a computer network or other data communications medium. This network may comprise either a hard wired local area network (LAN) such as Ethernet, a telephone modem link, or other conventional data communications network. Because the conference participants are linked via a computer network, the participants do not need to be located in the same physical space. Rather, an effective conference may be carried out as participants view common information over their display screens and manipulate the information using their cursor devices or other input devices.

Several problems with these conferencing systems exist in the prior art. Conventional conference participants typically have a cursor movement device, such as a mouse or trackball device, connected to their system. This cursor movement device provides a means for moving a visible cursor symbol around on the user's computer display screen. In this manner, a user may manipulate a local cursor symbol. It is also advantageous for a conference participant to manipulate a cursor or pointing symbol on the display screen of other conference participants. In this manner, a first conference participant can manipulate a remote cursor symbol on the display screen of a second conference participant using the cursor movement device of the first conference participant's computer system. A remote cursor can be effectively used as a conference pointing mechanism. In other situations, various conventional drawing tools or textual input tools provided by a personal computer can be used by a first conference participant and displayed to all of the conference participants. Prior art systems, however, do not provide an effective means for displaying to a local user when the actions of a cursor or selected tool are either visible or not visible to other conference participants. Although some conventional systems provide a means for turning on or turning off the remote display of cursor movement, these systems do not have an effective means for displaying this selection to a local user. Moreover, it is cumbersome to require a user to select a local or remote display mode prior to the initiation of any action in a conferencing environment.

Thus, a better means for providing feedback of remote cursor movement and tool operation in a conferencing system is needed.

SUMMARY OF THE INVENTION

The present invention is an apparatus and method for providing feedback to a local user of remote cursor movement or tool operation in a conferencing system. In a computer conferencing system including a first participant coupled to a second participant via a communication medium, the first participant having a first display, a first cursor control device, and a first signal generation device, the second participant having a second display, a second cursor control device, and a second signal generation device, a process and apparatus is disclosed for manipulating a remote cursor. This process comprises the steps of: 1) selecting a remote cursor tool using the first cursor control device and the first signal generation device, the remote cursor tool being a computer implemented function represented by an icon; 2) displaying the icon representing the remote cursor tool with an associated shadow only on the first display and only while the tool is selected; 3) activating the remote cursor tool using the first cursor control device and the first signal generation device; and 4) displaying the icon representing the remote cursor tool without an associated shadow on both the first display and the second display and only while the tool is active, the icon being displayed on the second display in a position corresponding to a position of the icon on the first display. The present invention also includes a process and an apparatus for implementing selected tool shadowing. This process comprises the steps of: 1) selecting a tool, the tool being a computer implemented function represented by an icon; 2) displaying the icon representing the tool with an associated shadow only while the tool is selected; 3) activating the tool to perform the function; and 3) re-displaying the icon representing the tool without an associated shadow only while the tool is active.

It is therefore an advantage of the present invention to provide a means and method for displaying remote cursor movement or tool operation in a computer conferencing system. It is a further advantage of the present invention to provide a visual indication that cursor movement or tool operation is or is not visible to remote conference participants. It is a further advantage of the present invention to provide a means for displaying a drawing tool or text input tool in a manner that indicates whether the tool is or is not actively drawing on a remote conference participants display screen. It is a further advantage of the present invention that both a public and private workspace are provided.

These and other advantages of the present invention are fully described in the following detailed description of the preferred embodiment.

BRIEF DESCRIPTION OF THE DRAWINGS

FIGS. 6a and 6b illustrate a typical drawing tool as displayed when the mouse button is not activated.

FIGS. 6c and 6d illustrate a typical drawing tool when the mouse button is activated (i.e. depressed).

FIGS. 7a and 7b illustrate a remote cursor symbol as displayed when the mouse button is not activated.

FIGS. 7c and 7d illustrate a remote cursor when the mouse button is activated.

DETAILED DESCRIPTION OF THE PREFERRED EMBODIMENT

The present invention is an apparatus and method for improving the display of tool operation and cursor movement in a conferencing system. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to obscure unnecessarily the present invention.

Figure 1:
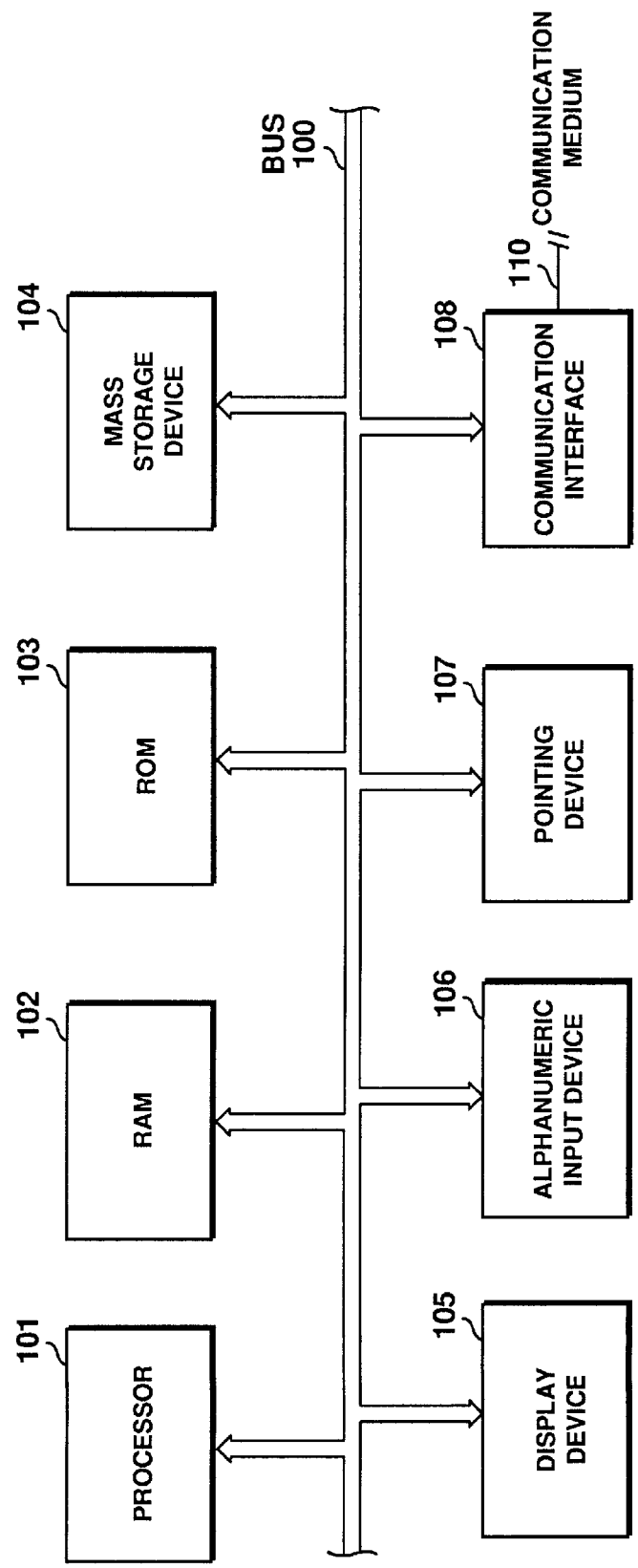
FIG. 1 is a block diagram illustrating the computer system hardware used in the preferred embodiment of the present invention.

Referring now to FIG. 1, a block diagram of the computer system hardware used in the preferred embodiment is illustrated. The computer system used in the preferred embodiment comprises a Bus 100 for communicating information between computer system components. These components coupled to Bus 100 include Processor 101. In the preferred embodiment, Processor 101 is an i486 brand microprocessor manufactured by Intel Corporation, Santa Clara, Calif. i486 is a registered trademark of Intel Corporation. Other system components include Random Access Memory (RAM) 102, Read Only Memory (ROM) 103, and mass storage device or disk drive 104. The computer system of the preferred embodiment also includes display device 105 coupled to the Bus 100 for displaying information to a computer user, an alphanumeric input device 106 coupled to the Bus 100 for communicating information and command selections to the Processor 101, a pointing device or cursor control device 107 coupled to the Bus 100 for communicating information and command selections to Processor 101, and a signal generation device 112 coupled to the Bus 100 for communicating command selections to the Processor 101. Display device 105 may be a liquid crystal device, cathode ray tube, or other suitable display device. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the display screen of display device 105. Many implementations of the cursor control device 107 are well known in the art, including trackball, mouse, joystick, or special keys on the alphanumeric input device 106 capable of signaling movement in a given direction. Signal generation device 112 is typically implemented as a button or switch located on or near the cursor control device 107. The physical proximity of cursor control device 107 and signal generation device 112 allows a user to manipulate both devices simultaneously with one hand. The signal generation device may be operated between two control states: an active control state typically initiated by depression of a mouse button, and an inactive control state typically initiated by releasing the mouse button.

The computer system used in the preferred embodiment also includes a communication interface 108. Communication interface 108 is coupled to communication medium 110. Communication interface 108 provides a means for the computer system to communicate with a network of other computer systems. A variety of other networks are well known in the art. These communication media 110 include well known Local Area Networks (LAN) such as Ethernet, Wide Area Networks (WAN), telephone modem links, or other well known and conventional computer networking technology. The configuration and interconnection of computer system components as illustrated in FIG. 1 is well known to those of ordinary skill in the art.

Figure 2:
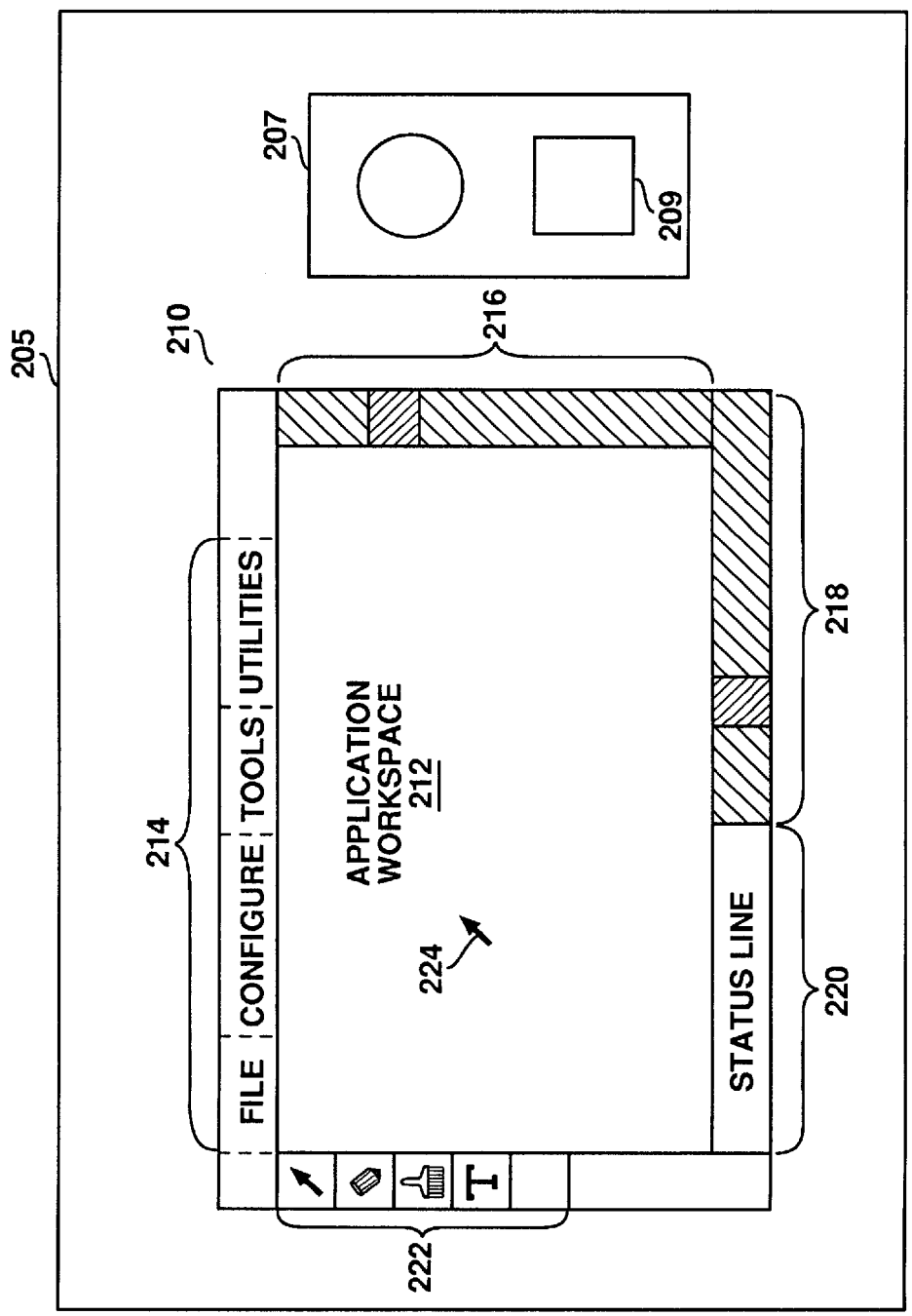
FIG. 2 illustrates a typical screen display provided in a conventional computer system.

Referring now to FIG. 2, a screen display 210 on a conventional computer system is illustrated. In addition, a cursor control device 207 (i.e. mouse) and signal generation device 209 (mouse button) is illustrated. Conventional screen display 210 comprises a displayed set or menu of function or command selections 214 displayed across the top of the display screen. In addition, tool selections 222 are displayed along a left hand edge of the display screen. Vertical scroll bar 216 and horizontal scroll bar 218 is also provided. A status line 220 provides a display region for various system status messages. This typical screen display 210 and corresponding user interface functionality is available in the prior art from various sources including the Windows operating system developed by Microsoft Corporation of Redmond, Wash., or various operating systems and applications running on the Apple Macintosh brand computer systems manufactured by Apple Computer, Inc. of Cupertino, Calif. Microsoft is a trademark of Microsoft, Inc. Apple and Macintosh are trademarks of Apple Computer, Inc.

Screen display 210 includes an application workspace 212 in which a user may draw images or type text using one of tools 222. In addition, a cursor symbol 224 is displayed and responsive to the movement to cursor control device 207. Cursor 224 provides a means for pointing to various regions on display screen 210. Again, the use of cursor symbol 224 is well known to those of ordinary skill in the art.

Figure 3:
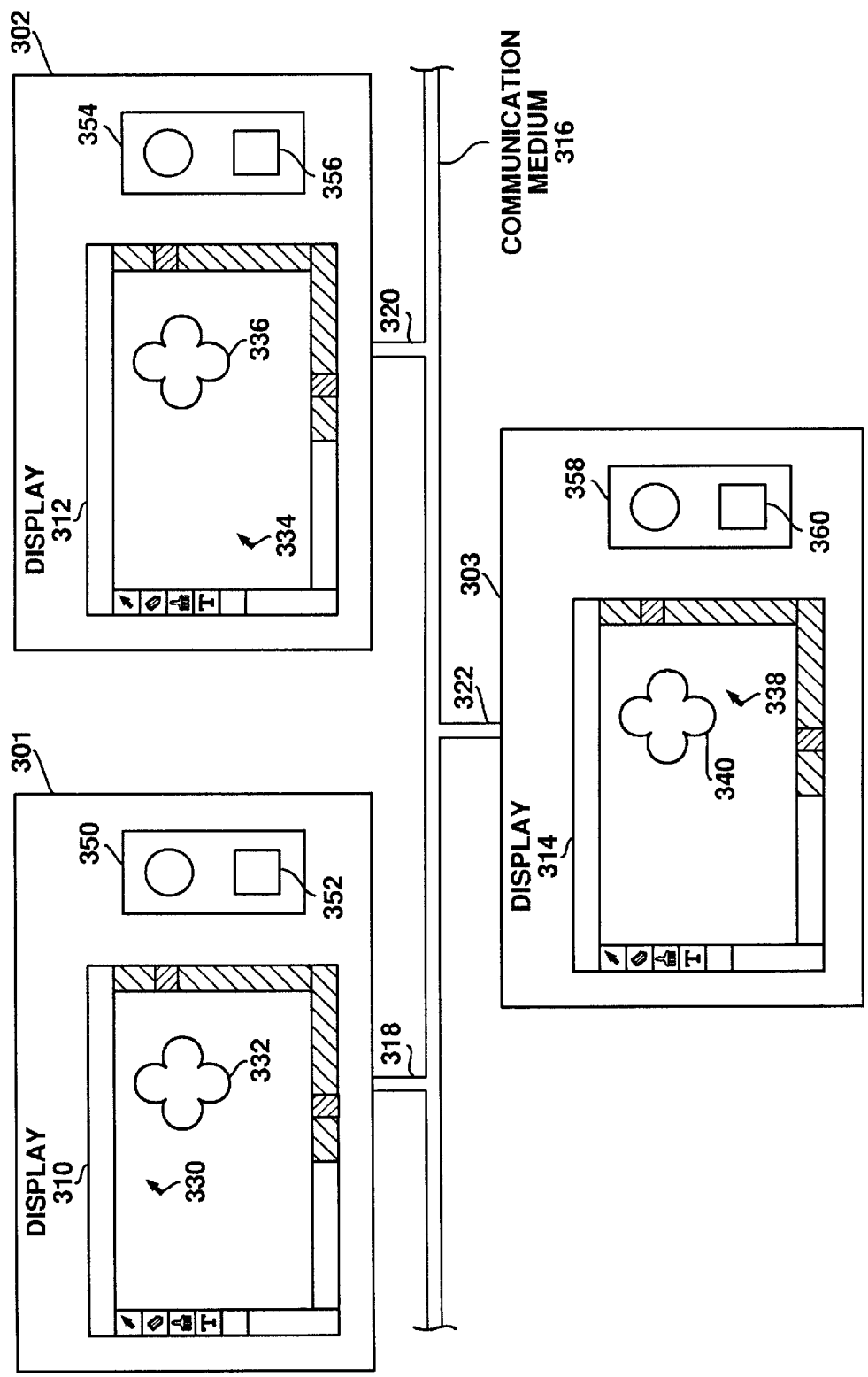
FIG. 3 illustrates a conventional computer system network having three independent computer systems interconnected on a communication medium.

Referring now to FIG. 3, a conventional computer network or conferencing system is illustrated. This sample conferencing system includes three computer systems, 301, 302 and 303, all coupled via communication medium 316. As described earlier, these computer systems, 301, 302 and 303, and the communication medium 316 over which they communicate are well known to those of ordinary skill in the art. Conventional computer system 301 includes a screen display 310, cursor control device 350, and mouse button 352. Cursor control device 350 is used to manipulate cursor symbol 330 on display 310. Because cursor 330 of display 310 is manipulated using cursor control device 350 of the same computer system 301, cursor 330 is called the local cursor of computer system 301. Any arbitrary object 332 may be displayed on display screen 310. Similarly, computer system 302 comprises display screen 312, cursor control device 354, and signal generation device 356. Local cursor 334 of display screen 312 is controlled by cursor control device 354. Computer system 303 comprises display screen 314, cursor control device 358, and signal generation device 360. Local cursor 338 of the display screen 314 is controlled via cursor control device 358.

Prior art networking systems provide means for transferring objects from one computer system to another across communication medium 316. For example, object 332 displayed on display 310 may be transferred via interface 318 across communication medium 316 to computer system 302 and/or computer system 303. In this manner, object 332 may be displayed on display 312 as object 336 and/or displayed on display 314 as object 340. Thus, information may be shared among computer systems 301, 302, and 303. Typically, cursors 330, 334, and 338 act as local cursors to the computer systems on which they are displayed.

Figure 4:
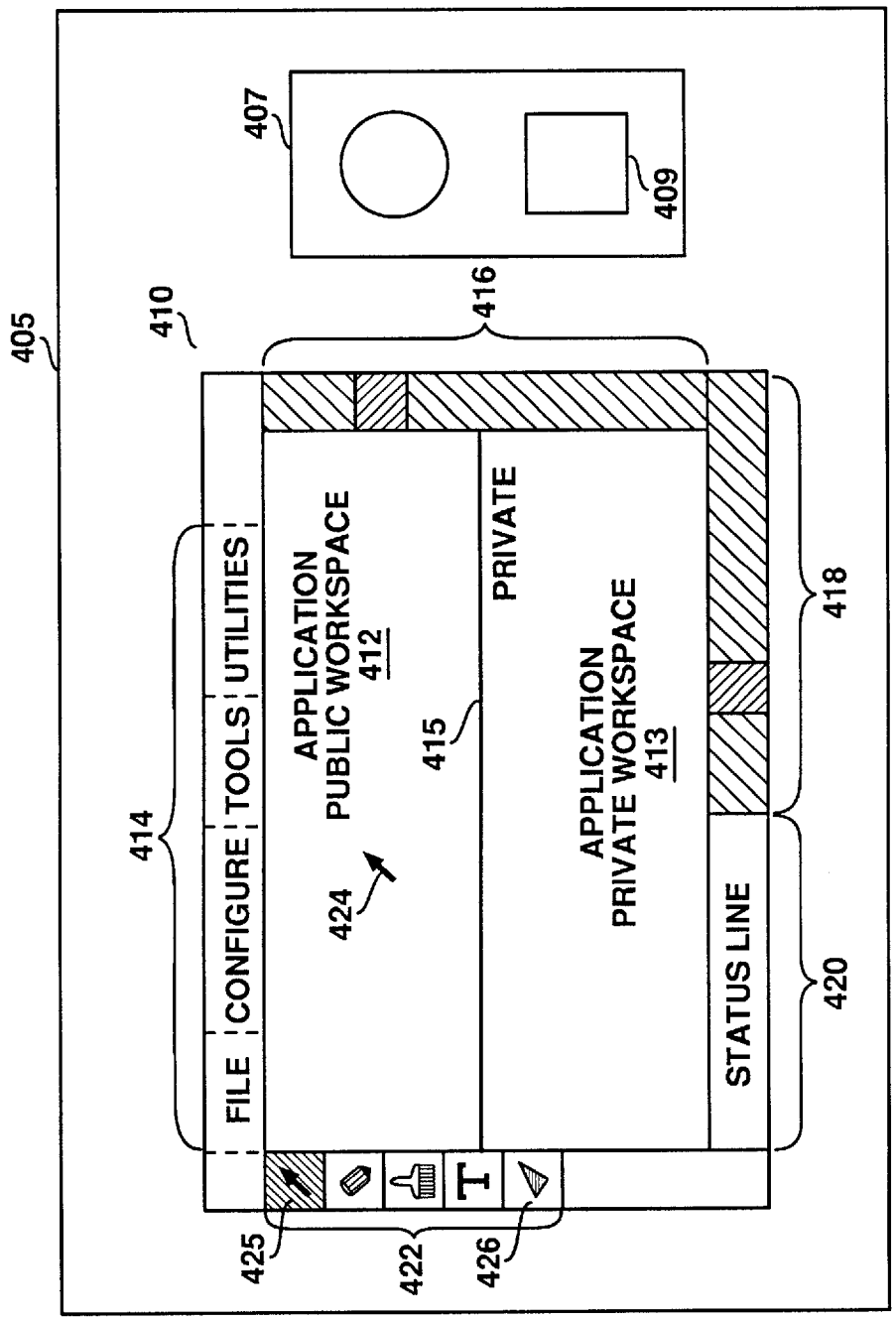
FIG. 4 illustrates the screen display provided by the preferred embodiment of the present invention. This screen display illustrates the public and private workspaces of the present invention.

Referring now to FIG. 4, a screen display 410 provided in the preferred embodiment of the present invention is illustrated. Screen display 410 includes prior art elements such as the function or command menu 414, the tool palette 422, the vertical scroll bar 416, the horizontal scroll bar 418, and optional status line 420. The preferred embodiment also uses cursor control device 407 and signal generation device or mouse button 409. In a unique diversion from the prior art, the present invention bisects the application workspace into application public workspace 412 and application private workspace 413 separated by line 415. Application public workspace 412 defines a region of display 410 that is visible to other conference participants on a network, such as the one illustrated in FIG. 3 and FIG. 4. A user of computer system 405 can select tools from tool palette 422 and draw or type annotations or objects within application public workspace 412. Any annotations or objects drawn in this region are transmitted across the conferencing network as data messages. In this manner, annotations or objects drawn on a first conference participant display are visible to other conference participants on the network. Scroll bars 416 and 418 may be used in a conventional manner to select in two dimensions the portion of application public workspace 412 visible within display 410. The border 415 between application public workspace 412 and application private workspace 413 may be vertically moved using cursor control device 407 and signal generation device 409 in order to selectively modify the size of public workspace 412 and private workspace 413. In the preferred embodiment, local cursor 424 is positioned using cursor control device 407 over border line 415. Signal generation device 409 may then be activated to initiate movement of border 415. With signal generation device 409 activated (i.e. depressed), cursor 424 is moved vertically using cursor control device 407. As this movement occurs with signal generation device 409 activated, border 415 is moved vertically with cursor 424 until signal generation device 409 is deactivated. At this point, border 415 is left at the cursor position where signal generation device 409 was deactivated. Border 415 may be moved across the entire vertical range of the application workspace within display 410. Application private workspace 413 comprises a region of display 410 wherein objects or annotations created are not transmitted to other conference participants. Annotations and objects created in application private workspace 413 using tools of tool palette 422 are only visible on the local display 410 of the computer system 405 on which the private annotations or objects were created. Thus, by locating cursor 424 in either the public workspace 412 or private workspace 413, a user can quickly determine if objects or annotations created will be visible to other conference participants.

Referring still to FIG. 4, a standard cursor tool 425 of tool palette 422 has been selected. The corresponding cursor 424 is displayed on display screen 410. The selection and display of this type of standard cursor is well known to those of ordinary skill in the art. As provided in the preferred embodiment of the present invention, tool palette 422 includes a remote cursor tool 426. The remote cursor tool 426 provides a means for remotely displaying a pointing symbol on the display screen of other conference participants. The characteristics and operation of remote cursor 426 are described in detail below in connection with FIGS. 7a through 7d, FIG. 12, FIG. 13, and FIG. 14. It will be apparent to those of ordinary skill in the art that any of tools 422 may be selected and used in either application public workspace 412 or application private workspace 413.

Figure 5:
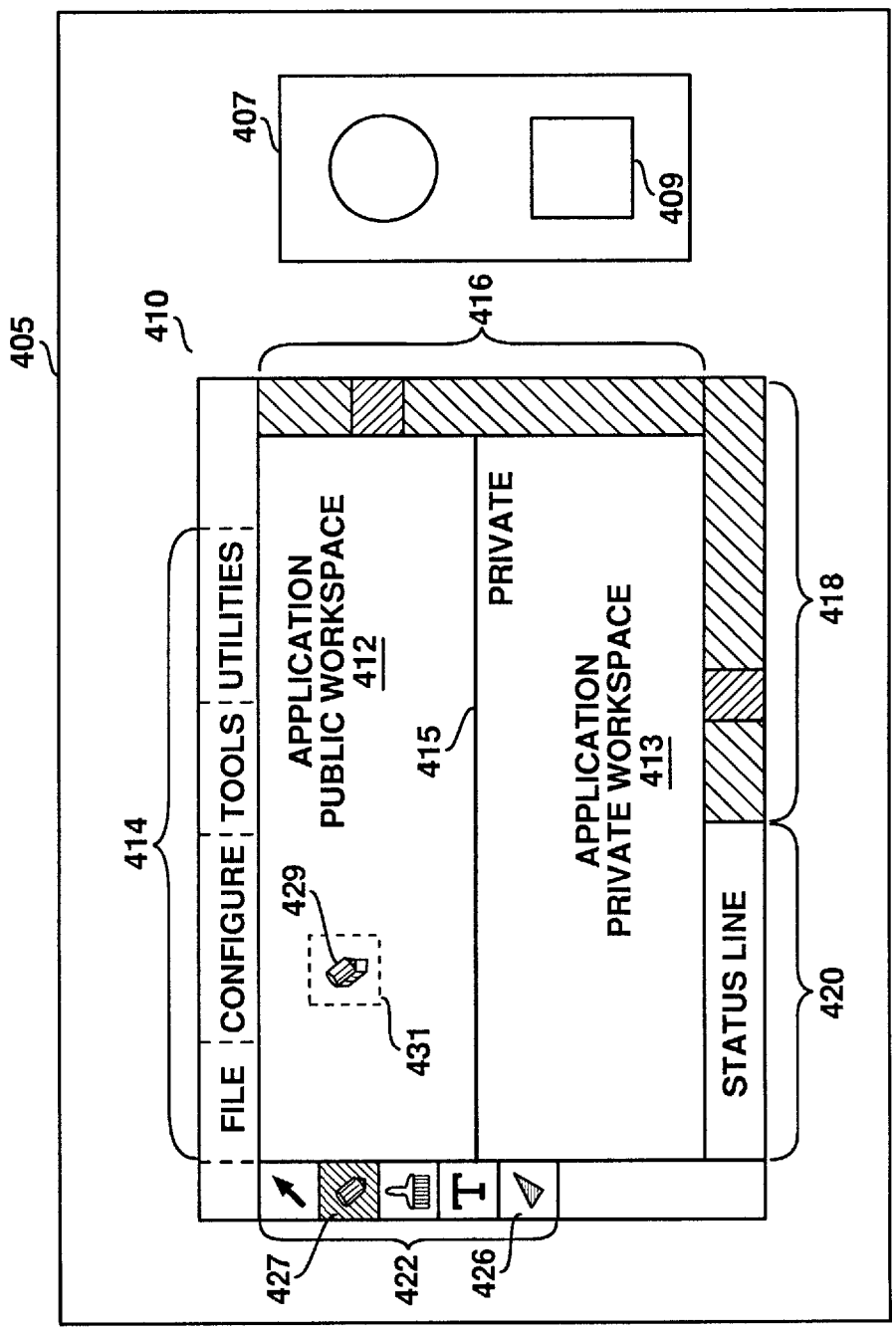
FIG. 5 illustrates a screen display with a tool selected and displayed in the public workspace.

Referring now to FIG. 5, a unique visual feedback mechanism of the preferred embodiment is illustrated. In this example of the present invention, a drawing tool 427 has been selected from palette 422. As a result, the cursor symbol changes to a representation 429 of the selected tool. As a unique improvement to the visual display of the selected tool, a tool shadow is displayed along with the selected tool representation 429. In order to highlight the display of selected tool representation 429, the area 431 of application public workspace 412 is highlighted in FIGS. 6a and 6c.

Referring now to FIG. 6a, a cursor symbol 616 is shown as a selected tool representation 618 with a shadow 620. Conventional techniques exist for displaying a shadow which corresponds to a displayed object. In the present invention, shadow 620 supports the intuitive paradigm that selected tool 618 is suspended above the surface of the application workspace. This paradigm corresponds to a manual writing implement (i.e. pen or pencil) suspended above a writing surface prior to use. As intuitively clear, a writing implement so suspended cannot make marks on the writing surface. Similarly, selected tool cursor 618 indicates to a user that a selected tool is not yet activated for writing on the application workspace. The selected tool is not activated yet as indicated by the signal generation device or mouse button 622 depicted in FIG. 6b. As illustrated in FIG. 6b, mouse button 622 is in a released and deactivated position.

Referring now to FIG. 6c, selected tool cursor 636 is illustrated after mouse button 638 illustrated in FIG. 6d has been activated (i.e. depressed). In this situation, the shadow 620 of selected tool cursor 636 has disappeared. The removal of shadow 620 supports the intuitive paradigm that selected tool 636 has been lowered onto a writing surface and is now in a position to make marks on the application workspace. Indeed, this is the case in the operation of the present invention. With mouse button 638 activated (i.e. depressed), the selected tool 636 is activated to create a drawing annotation on the application workspace as the cursor control device 407 is moved. Thus, the selected tool shadowing mechanism used in the present invention provides an effective visual feedback of a tool that is either deactivated or activated for drawing on an application workspace.

The real benefit of the selected tool shadowing of the present invention is apparent in a networked or conferenced computer environment. In this situation, drawing tools used on a first conference participant's computer system may be displayed on other conference participants display screens. Without selected tool shadowing, it is not always clear when a selected tool may be making marks or creating objects on a remote participant's computer display screen. This is particularly important in the use of a remote cursor or remote pointing tool such as tool 426 illustrated in FIG. 4. Remote cursor tool 426 provides a means for a first networked computer user or local user to activate and display a pointing symbol on a different networked computer user's display screen (i.e. a remote user). In this manner, one conference participant may point to a shared portion of a display screen to assist a remote conference participant.

The selected tool shadowing feature of the present invention is also used with a remote cursor such as remote cursor 426. Referring now to FIGS. 7a through 7d, the selected tool shadowing of the remote cursor tool is illustrated. In FIG. 7a, selected tool representation 716 is shown as comprising a remote cursor symbol 718 with its corresponding shadow 720. Shadow 720 is displayed as long as the signal generation device or mouse button 722 illustrated in FIG. 7b is in the released or deactivated position. While signal generation device 722 is deactivated, the position of remote cursor 718 on a local user's display screen is not transmitted to other conference participants across a computer network. In this situation, the shadow 720 indicates that the remote cursor symbol is not visible to remote conference participants.

Once signal generation device 738 is depressed or activated as illustrated in FIG. 7d, shadow 720 of cursor symbol 736 is removed. The removal of shadow 720 provides a visual indication to a local computer user that the position of the remote cursor is now visible to other remote conference participants. The depression or activation of signal generation device 738 initiates the transfer of cursor movement messages across the network to other remote conference participants. In this manner, remote conference participants receive remote cursor position information and may display this information on their display screens as a remote cursor symbol. The transmission of remote cursor position information and the display of the remote cursor 736 on the display screens of other conference participants continues as long as signal generation device 738 is active. Thus, selected tool shadowing of a remote cursor tool provides a visual indication to a local user that a remote cursor symbol is or is not visible to other conference participants.

Figure 8:
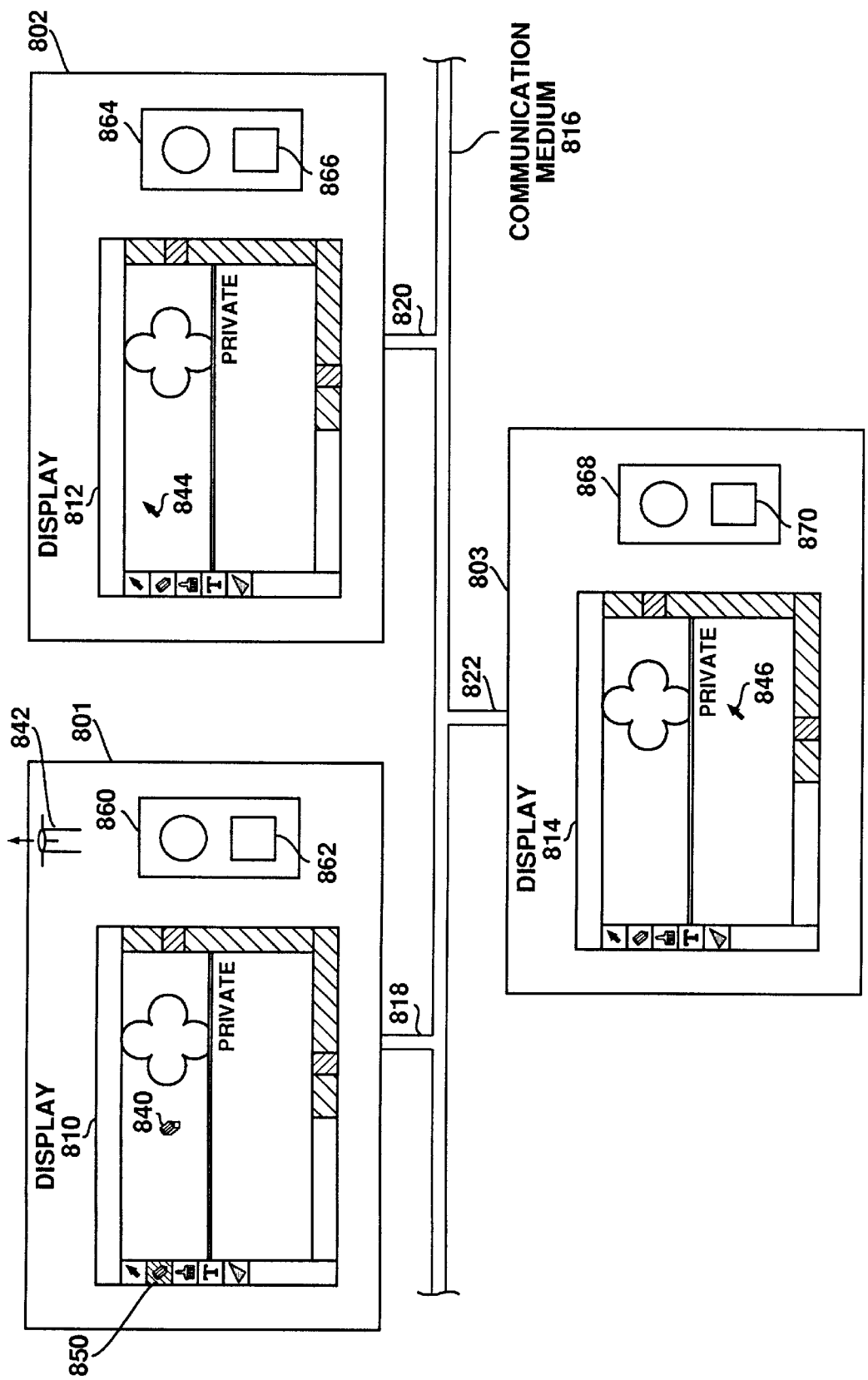
FIG. 8 illustrates a set of three networked computer users in a conferencing situation. One of the conference participants is illustrated as having selected a drawing tool on its local display screen.

Referring now to FIGS. 8 through 14, various examples of the present invention are illustrated as used in a conferencing environment. Referring now to FIG. 8, three conference participants, 801, 802, and 803, are illustrated as coupled via communication medium 816. Each conference participant comprises a display, a cursor control device, and a signal generation device or mouse button. In the example illustrated in FIG. 8, conference participant 801 has selected a drawing tool 850 from the tool palette. As a result, selected tool 840 with a corresponding shadow is illustrated on display 810. The shadow of selected tool representation 840 is displayed because the signal generation device 862 is deactivated as indicated by the graphic depiction 842. Note that as long as the signal generation device of system 801 is deactivated, no symbol corresponding to selected tool representation 840 appears on the display screen 812 and 814 of other conference participants 802 and 803. Conference participant 802 is free to move its local cursor 844 using cursor control device 864 independently of the movement of selected tool representation 840 using cursor control device 860. Similarly, conference participant 803 is free to move its local cursor 846 using cursor control device 868 independently of either conference participants 801 or 802.

Figure 9:
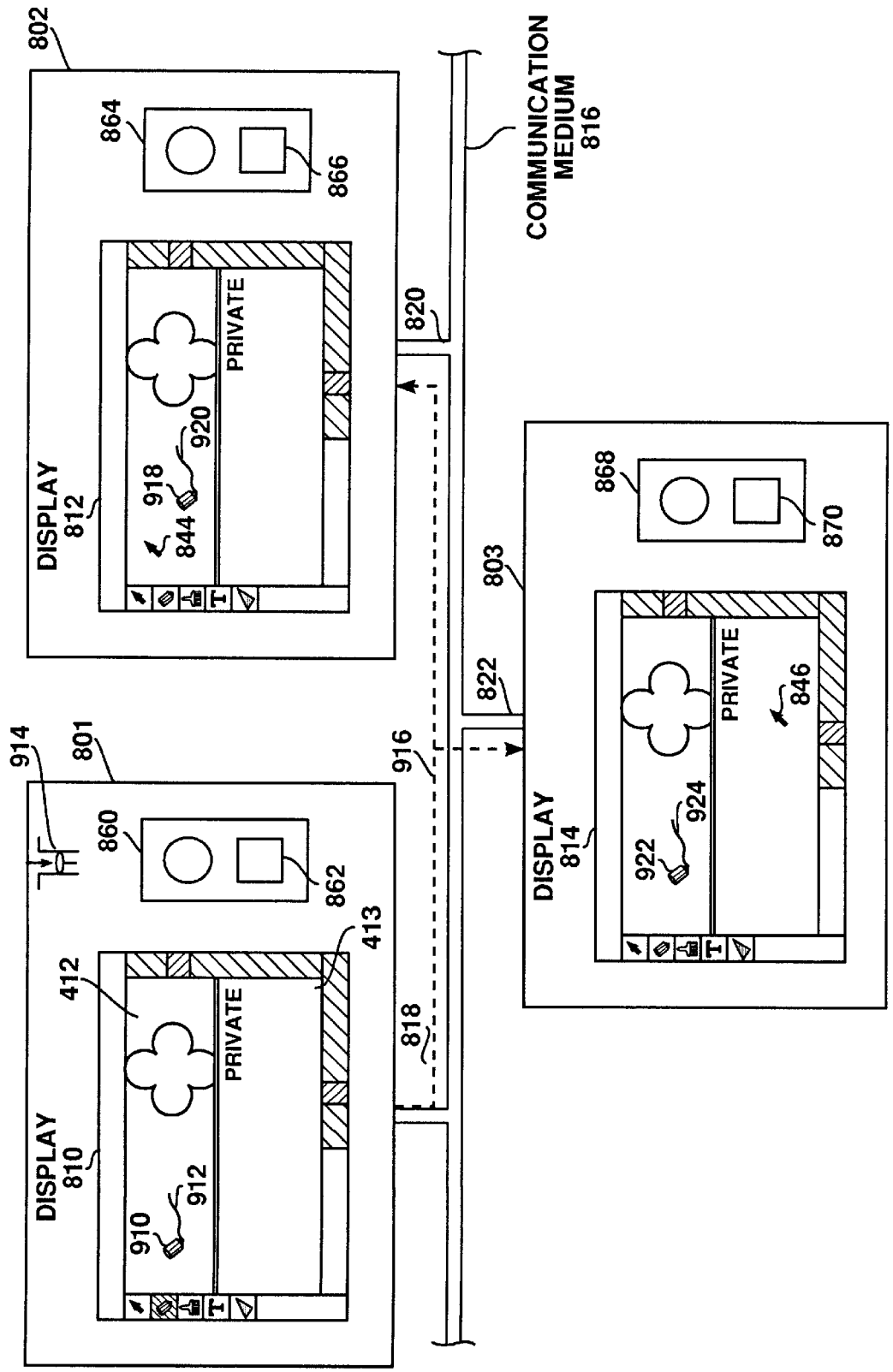
FIG. 9 illustrates a conferencing system where a conference participant is using a drawing tool in its public workspace. As illustrated, the drawing actions in the public workspace are visible to all conference participants.

Referring now to FIG. 9, a sample conferencing system illustrates the use of a tool in the public workspace area 412 of computer system 801. In a manner similar to the example shown in FIG. 8, a drawing tool has been selected on computer system 801. After having selected the drawing tool, the user of system 801 moves cursor 910 into public workspace 412. Next, the user depresses the signal generation device or mouse button 862 as indicated by graphic depiction 914. The user then manipulates cursor control device 860 to move cursor 910 to its position as shown in FIG. 9. As a result, line 912 is drawn between the initial cursor position at the time signal generation device 862 was activated and the current position of cursor 910. As shown by the difference between the selected tool representation 840 illustrated in FIG. 8 and the selected tool representation 910 illustrated in FIG. 9, the shadow corresponding to selected tool representation 910 has been removed as the signal generation device 862 has been activated. Thus, the shadow on cursor 910 is not visible as the selected tool actively draws an annotation or object in public workspace 412.

Because the selected drawing tool as represented by cursor symbol 910 has been manipulated within public workspace 412 in the example of FIG. 9, the operation of tool 910 is transferred to other conference participants as data messages across communication medium 816 as indicated by the dashed lines 916 illustrated in FIG. 9. Strictly because of the operation of tool 910 within public workspace 412, computer system 801, and the processing logic of the present invention therein, generates data messages defining the representation of tool 910 and the annotation or objects 912 created by tool 910. These messages are then transferred to each conference participant via communication medium 816. As a result, selected tool representation 918 and annotation 920 appears within the public workspace of computer system 802. Similarly, selected tool representation 922 and annotation 924 appear in the public workspace of computer system 803. Other conference participants (not shown) will receive a similar set of information. Thus, it can be seen from the example of FIG. 9 that the present invention does not require a previously specified or configured mode of operation to enable the remote display of objects or annotations in a conferencing environment. By simply positioning the cursor within the public workspace, the user implicitly enables the transfer of subsequently drawn annotations or objects to all other conference participants on the network. In the example illustrated in FIG. 9, the user of computer system 801 may continue drawing within public workspace 412 as long as signal generation device or mouse button 862 is activated (i.e. depressed). As long as mouse button 862 is depressed, annotations and objects will continue to be updated on the display screen of other remote conference participants and the selected tool representation will also continue to be displayed on the display screen of the remote conference participants.

Figure 10:
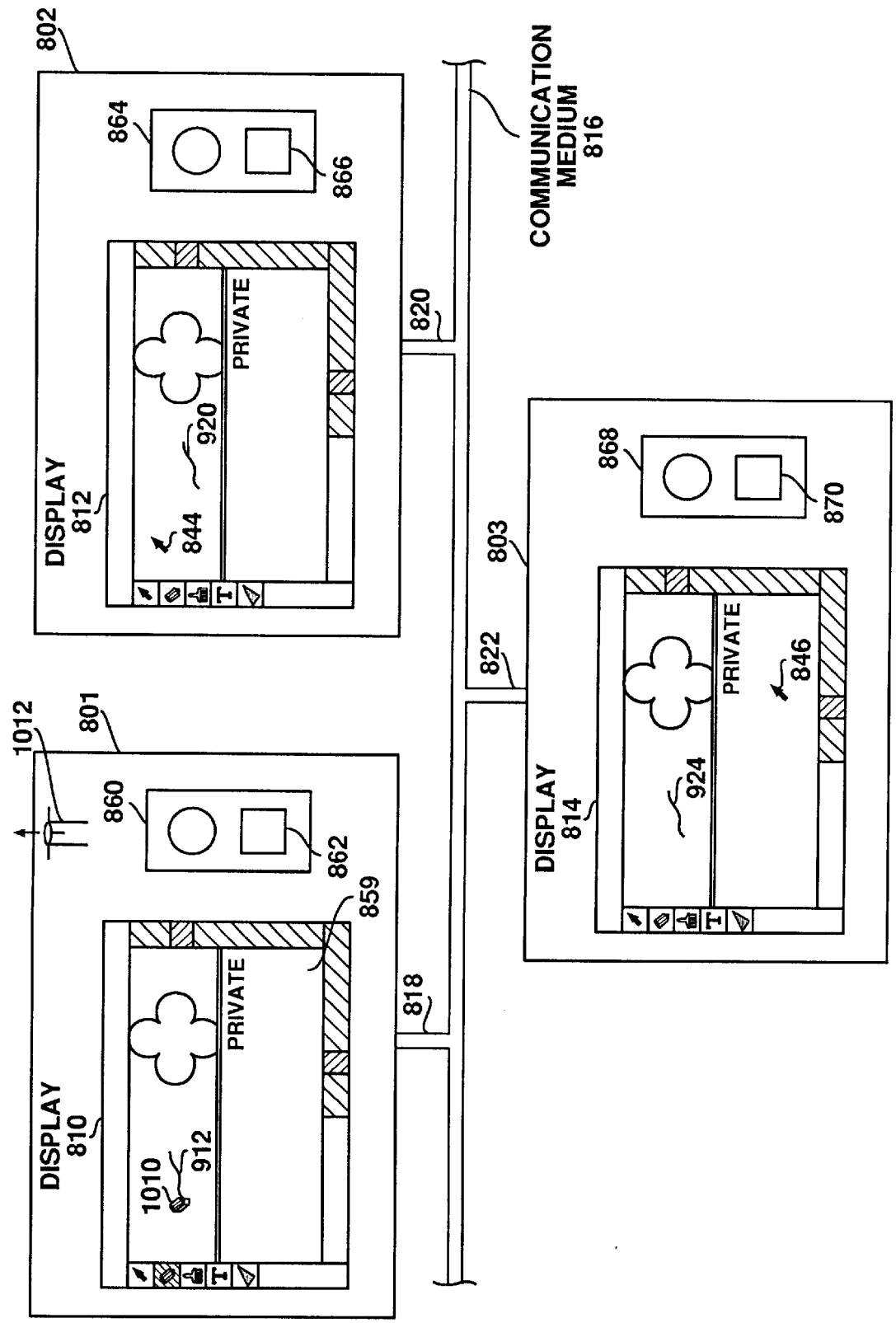
FIG. 10 illustrates a conferencing system wherein a previously selected drawing tool is deactivated as a user releases the mouse button.

Referring now to FIG. 10, an example illustrates the state of the conferencing system of the example of FIG. 9 after the user of computer system 801 releases or deactivates mouse button 862 as indicated by graphic depiction 1012. As mouse button 862 is released, selected tool representation 1010 is again displayed with its corresponding shadow. The active operation of selected tool 1010 is no longer enabled. For that reason, the drawing of annotation 912 is terminated. Also as a result of the deactivation of mouse button 862, the transfer of selected tool annotation messages and cursor movement messages are discontinued across communication medium 816. Because remote conference participants 802 and 803 no longer receive cursor movement messages, the selected tool representation 918 illustrated for system 802 in FIG. 9 is removed from the display 812 illustrated in FIG. 10 after signal generation device 862 deactivation. The annotation created by selected tool 1010; however, is still displayed as annotation 920 illustrated in FIG. 10. Similarly, the selected tool representation 922 illustrated in FIG. 9 is removed from the display 814 illustrated in FIG. 10 upon deactivation of signal generation device 862. The corresponding annotation 924, however is still displayed on computer system 803 display 814. Thus, the user of computer system 801 is now free to move cursor 1010 around display 810 without any corresponding representation appearing on the display of the remote conference participants.

Figure 11:
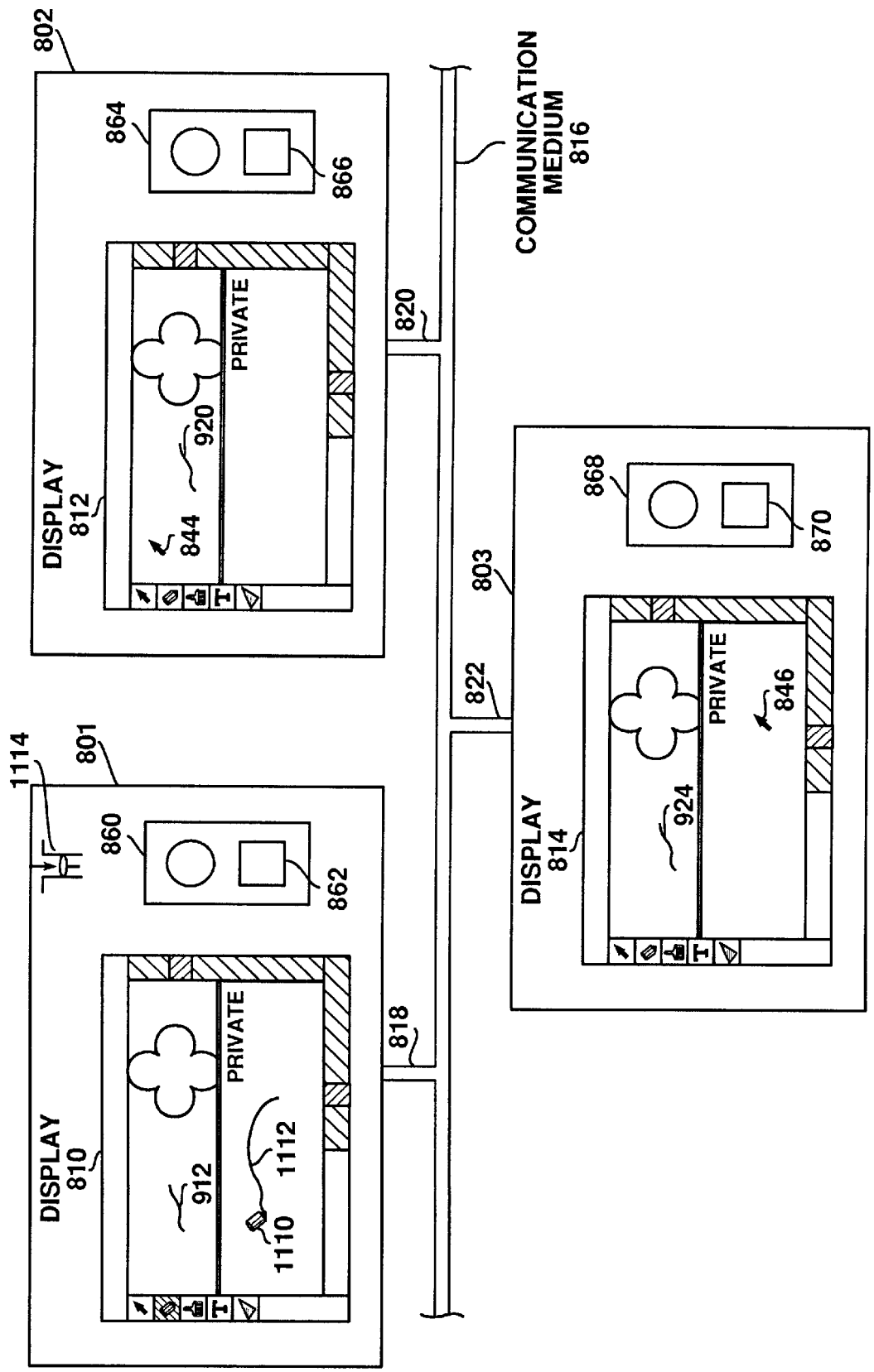
FIG. 11 illustrates a conferencing system wherein a drawing tool is used in the private workspace. As illustrated, other conference participants do not see the drawing actions in the private workspace.

Referring now to FIG. 11, an example illustrates the operation of a selected tool within private workspace 859. As illustrated in FIG. 11, a drawing tool has been selected and the cursor 1110 has been moved into the private workspace 859. As indicated by graphic depiction 1114, the signal generation device 862 has been activated. Annotation 1112 has been drawn within private workspace 859. Note that no corresponding annotation appears on display 812 of computer system 802 nor display 814 of computer system 803. Because the cursor 1110 is located within the confines of private workspace 859, the processing logic of the present invention disables the transfer of annotation or cursor movement messages across communication medium 816. It is advantageous in the present invention that no preconfigured or preselected mode is required to specify the private display of annotation 1112. By simply drawing within the private workspace 859 region, the user of system 801 is able to inhibit the public display of annotations or objects created locally.

Figure 12:
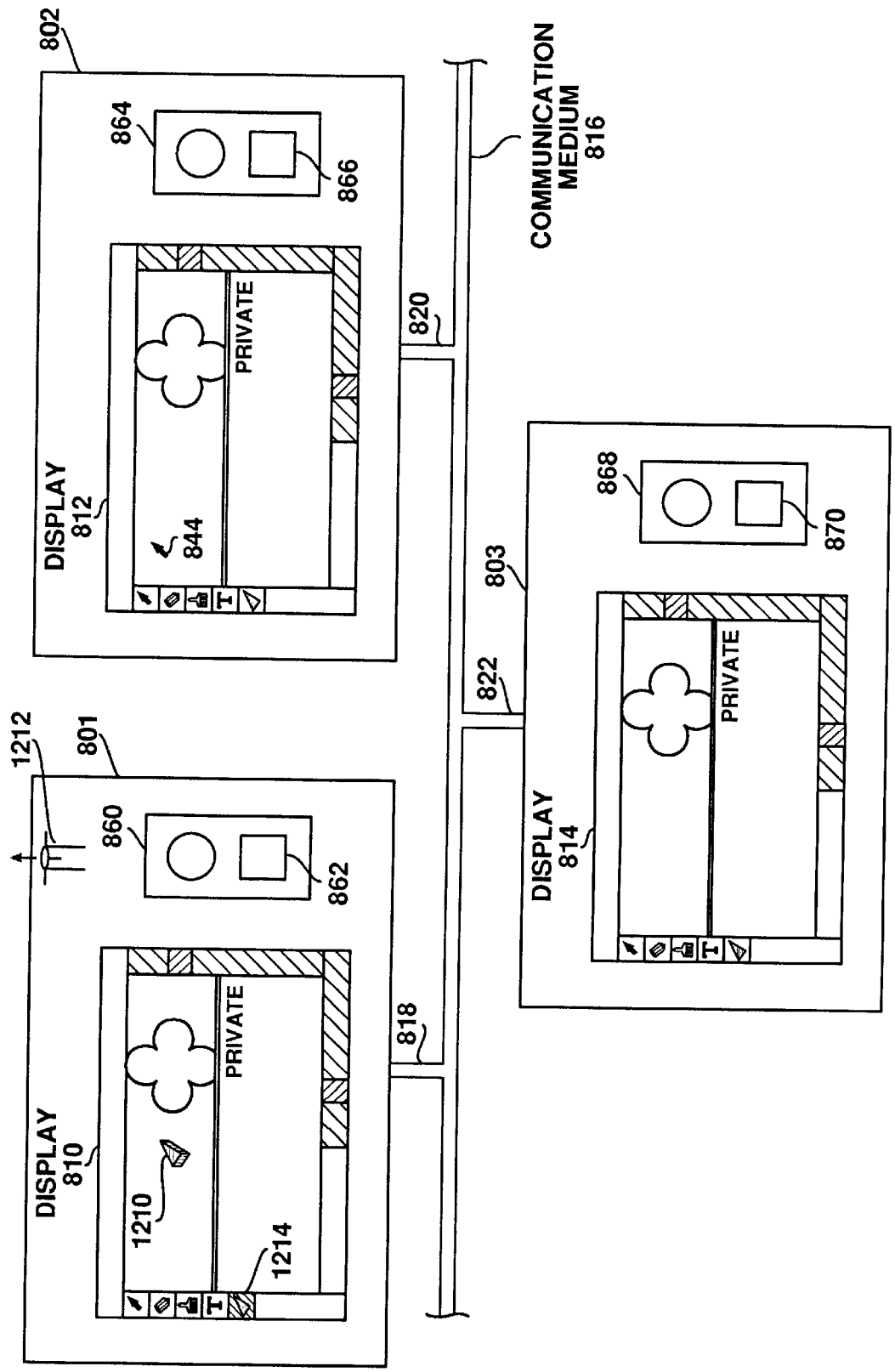
FIG. 12 illustrates a conferencing system wherein a remote cursor tool is selected.
Figure 13:
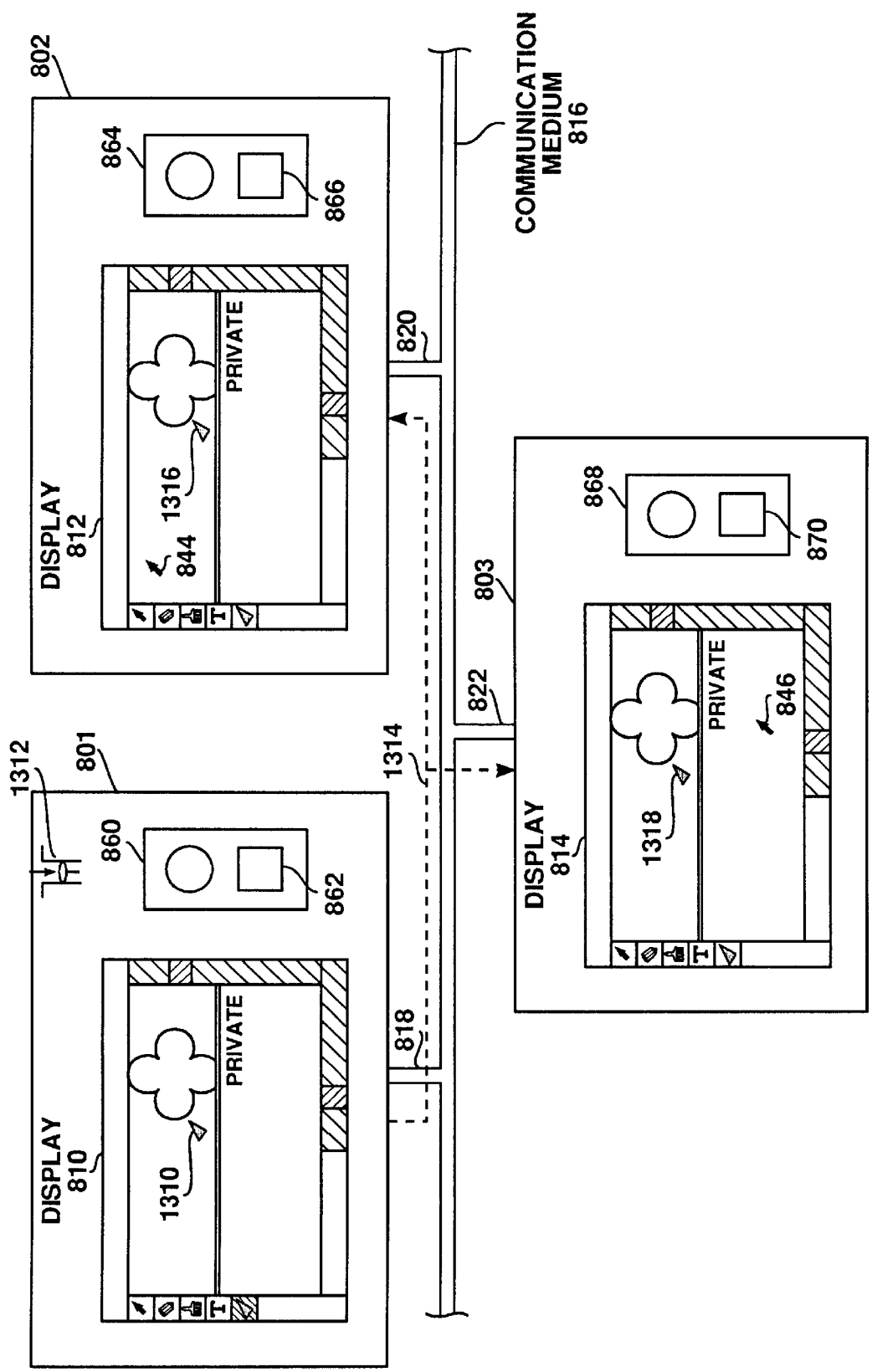
FIG. 13 illustrates a conferencing system wherein a remote cursor tool is selected and activated using the mouse button.

Referring to now to FIG. 12, an example illustrates the operation of the remote cursor or remote pointing tool of the present invention. The remote cursor is provided as a tool 1214 of the tool palette of computer system 801 as illustrated in FIG. 12. As illustrated in display 810, remote cursor tool 1214 has been selected and a corresponding selected tool cursor representation 1210 is displayed on display 810. Using cursor control device 860, this cursor representation 1210 may be moved about display 810. Note that the cursor representation 1210 appears in display 810 with a corresponding shadow indicating that remote cursor 1210 is not yet visible to other conference participants. This is true as no remote cursor symbol is displayed on display 812 or display 814 as illustrated in FIG. 12. Cursor symbol 1210 will continue to be shadowed and public display of the remote cursor will be disabled as long as signal generation device 862 is deactivated as indicated by graphic depiction 1212. FIG. 13 illustrates the result of the activation of signal generation device 862 as illustrated by graphic depiction 1312. Note that remote cursor symbol 1310 illustrated in display 810 is no longer displayed with its corresponding shadow. The removal of the shadow of cursor symbol 1310 indicates to the user of system 801 that the remote cursor symbol is being remotely displayed on the display screens of other conference participants. As indicated in FIG. 13, the activation of signal generation device 862 causes cursor movement messages to be generated by system 801 and transferred across communication medium 816 to other conference participants as indicated by dashed line 1314 illustrated in FIG. 13. As a result of the transfer of these cursor movement messages, remote cursor symbol 1316 appears on display 812 and remote cursor symbol 1318 appears on display 814. Remote participant 802 still has control over its local cursor 844 using cursor control device 864. Similarly, system 803 has control over its local cursor 846 using cursor control device 868. Remote cursor symbols 1316 and 1318, however move around display 812 and display 814, respectively, in a manner corresponding to the movement of cursor control device 860 of computer system 801, as long as the signal generation device 862 is active. In this manner, the user of system 801 can use a remote cursor to point to various locations within the public workspace of other conference participants. In the preferred embodiment, the remote cursor tool only provides the display of a remote cursor symbol on the display of other conference participants if the remote cursor tool is used within the public workspace of a local system.

Figure 14:
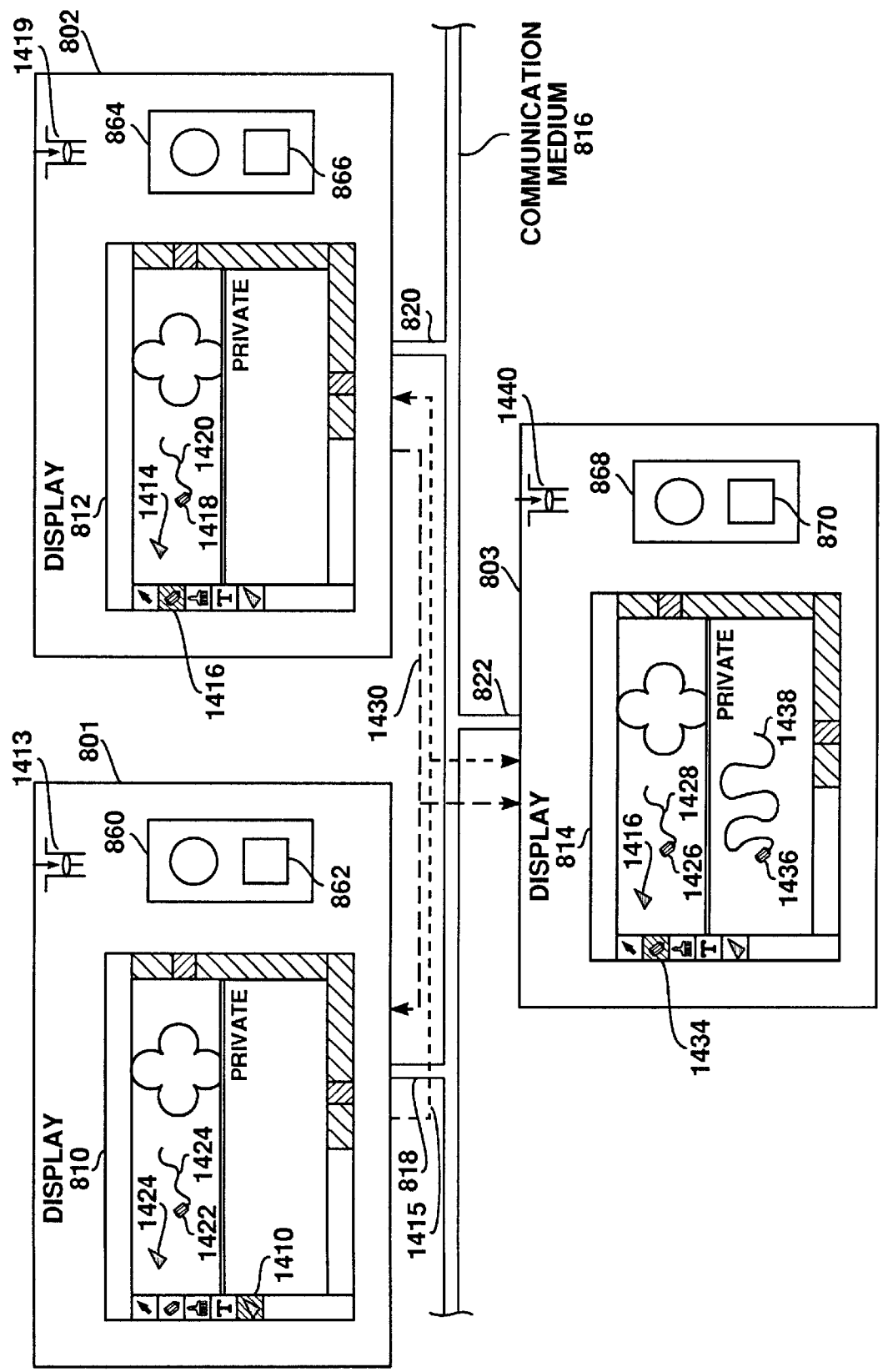
FIG. 14 illustrates a conferencing system wherein each conference participant selects a tool in either the public workspace or the private workspace.

Referring now to FIG. 14, an example of a conferencing system illustrates the use of the features of the present invention by any one of the conference participants. For example, the user of system 801 has selected a remote cursor tool 1410 as the cursor 1412 was located in the public workspace of system 801. Because signal generation device 862 has been activated as indicated by graphic depiction 1413, cursor movement messages are transferred to other conference participants as indicated by dashed line 1415. As a result, remote cursor symbol 1414 appears in display 812 and remote cursor symbol 1416 appears in display 814.

The user of system 802 has selected a drawing tool 1416 and positioned a cursor within the public workspace of system 802. Signal generation device 866 has been activated as indicated by graphic depiction 1419. As a result, the shadow of selected tool 1418 has been removed and an annotation 1420 is drawn as the cursor control device 864 is moved by the user of system 802. Because the annotation 1420 is being drawn within the public workspace of system 802, the cursor movement messages and annotation messages are transferred from system 802 across communication medium 816 to other conference participants as indicated by dashed line 1430. As a result, the graphic annotation 1424 appears in display 810 and the remote cursor symbol 1422 also appears in display 810 as long as signal generation device 866 of system 802 is active. Similarly, annotation 1428 and remote cursor symbol 1426 appear in display 814 on system 803.

The user of system 803 has selected a drawing tool 1434 and positioned the cursor within the private workspace of display 814. Signal generation device 870 has been activated as depicted by graphic representation 1440. As a result of moving cursor control device 868, graphic annotation 1438 has been drawn in the private workspace. Similarly, the selected tool cursor 1436 is shown in display 814. Because the operation of selected tool 1434 is taking place within the private workspace of display 814, no data messages are sent by system 803 on communication medium 816 to other conference participants. Thus, no remote display of annotation 1,438 or selected tool cursor 1436 appears on the display screen of other conference participants.

Figure 15:
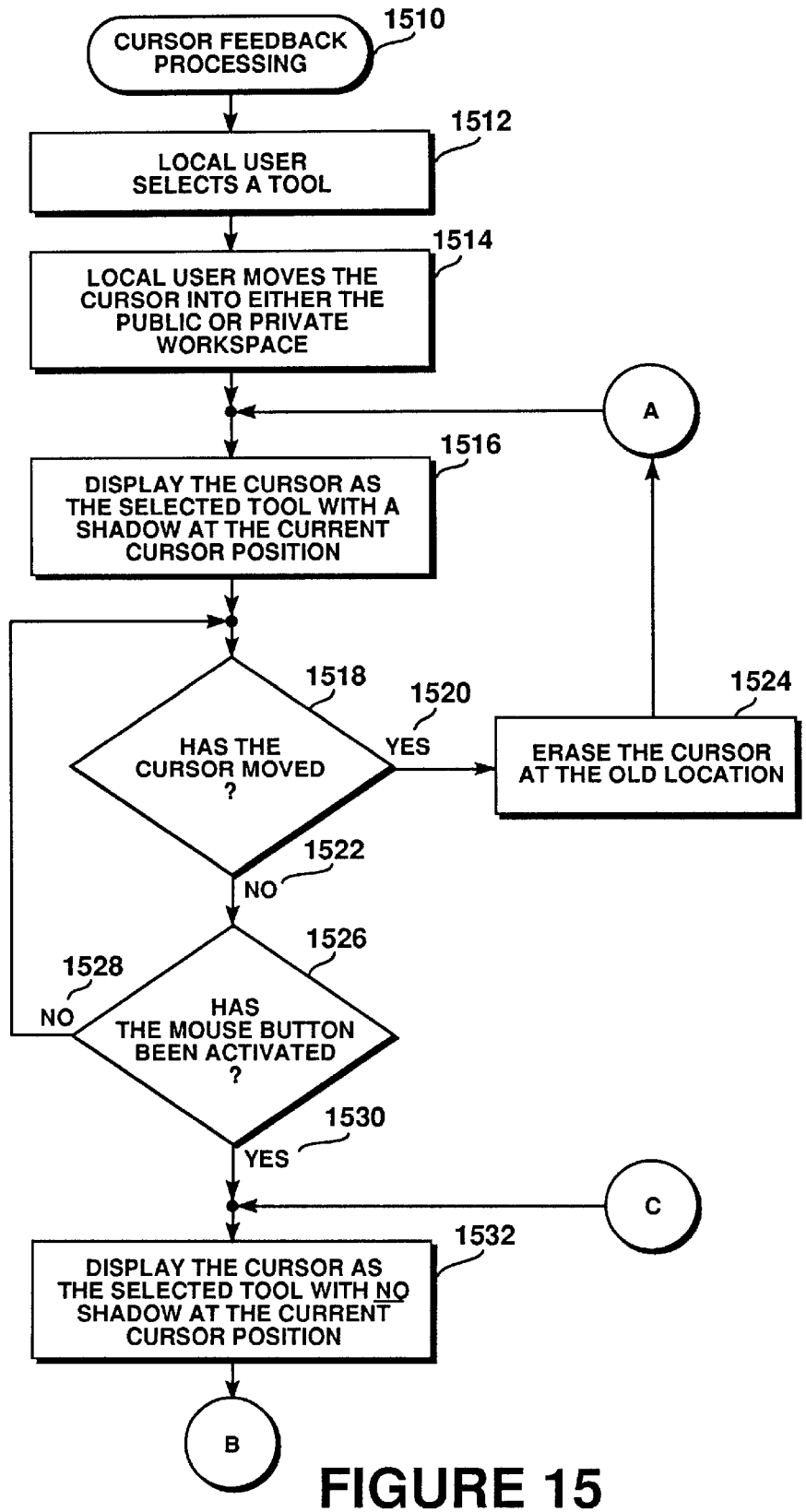
FIGS. 15 and 16 are flowcharts illustrating the processing logic of the present invention.
Figure 16:
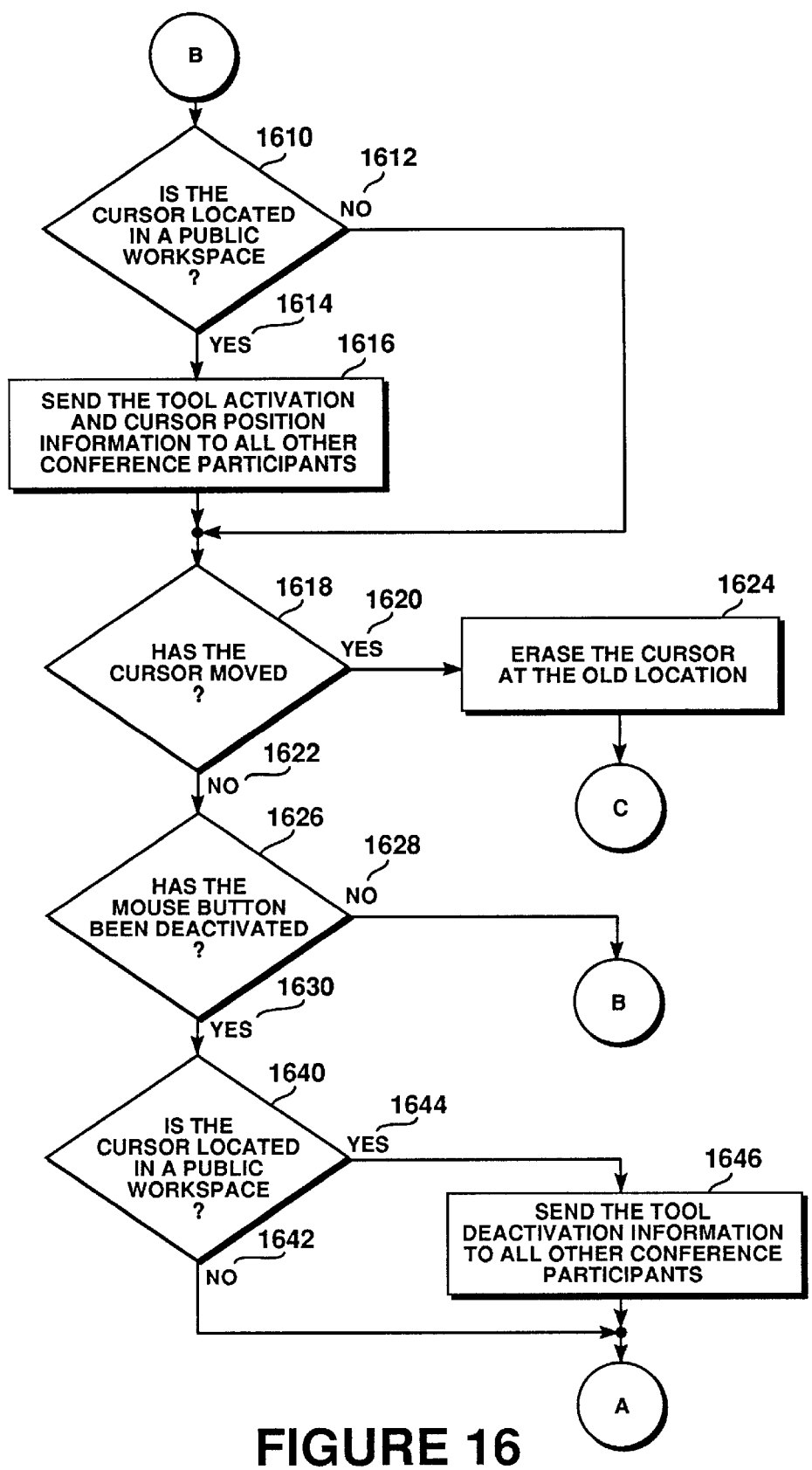

Referring now to FIGS. 15 and 16, flowcharts illustrate the processing logic of the present invention. The processing logic of the preferred embodiment is operably disposed within random access memory 102 and executed by processor 101 of the computer system described in reference to FIG. 1. The processing logic of the present invention may equivalently be disposed in read only memory 103 or other memory means accessible to processor 101 for execution. This processing logic can be a separately compiled or loaded entity or incorporated as a part of a larger operating system or application software package. In either case, a means for activating the processing logic of the present invention may be employed using techniques well known to those of ordinary skill in the art. Once activated, the processing logic of the present invention operates in the manner described below.

Referring now to FIG. 15, the cursor feedback processing 1510 of the present invention is illustrated. In processing block 1512, a local user of a computer system selects a tool from a tool palette as well known to those of ordinary skill in the art. The local user may then move the cursor into either the public or private workspace (processing block 1514). The cursor symbol is then replaced with a representation of the selected tool in processing block 1516. In addition, a shadow corresponding to the selected tool is displayed with the cursor symbol at the current cursor position. If the cursor moves, processing path 1520 is taken to processing block 1524 where the cursor representation and shadow at the old position is erased. Processing continues through the bubble labeled A at processing block 1516 where the cursor and corresponding shadow are displayed at the new cursor position. This process continues as long as the cursor moves and the mouse button or signal generation device is inactive. If the signal generation device or mouse button is activated (i.e. depressed), processing path 1530 is taken to processing block 1532 where the shadow is removed from the cursor representation. Processing continues at the bubble labeled B illustrated in FIG. 16.

Referring now to FIG. 16, the cursor feedback processing of the present invention continues at the bubble labeled B. Because the signal generation device has been activated and the cursor shadow has been removed, processing continues at decision block 1610. In this case, the current location of the cursor is tested. If the cursor is located in the public workspace, processing path 1614 is taken to processing block 1616 where the tool activation and annotation messages and the cursor movement information is formatted into data messages which are transferred across the communication medium to all other conference participants. As a result of this transfer of information, the remote conference participants display the active tool cursor representation and the annotations for objects created by that tool on their local display screens. As long as the cursor continues to move, processing path 1620 is taken to processing block 1624 where the cursor at the old location is erased and processing continues through the bubble labeled C illustrated in FIG. 15 where the cursor without the shadow is displayed in the new cursor position. As long as the signal generation device remains active, processing path 1628 is taken and processing continues through the bubble labeled B illustrated in FIG. 16. Once the signal generation device or mouse button is deactivated, processing path 1630 is taken to decision block 1640. If the cursor is located in the public workspace when the mouse button is deactivated, tool deactivation information is sent to all other conference participants (processing block 1646). Otherwise, no deactivation information is sent across the network (processing path 1642). Processing then continues at the bubble labeled A illustrated in FIG. 15. In this case, the cursor is displayed as represented by the selected tool, this time with a shadow at the current cursor position. Tool activation and cursor movement messages are no longer transferred to remote conference participants for a cursor located in the public workspace. These steps continue as the cursor control device moves and the signal generation device is activated and deactivated.

Thus, an improved method and apparatus for remotely displaying cursor and tool activation is disclosed. These specific arrangements and methods herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. In a computer system, an apparatus for indicating whether a tool is active or inactive, comprising:

a selection device configured to select a tool, said tool being a computer implemented function represented by an icon;

a display device configured to display said icon as a cursor, wherein said display device displays said cursor icon with an associated shadow only while said tool is selected and inactive; and an activation mechanism configured to activate said tool to perform said computer implemented function, wherein said display device re-displays said cursor icon without an associated shadow only while said tool is selected and active.

2. The apparatus of claim 1 further including a remote display mechanism configured to display said cursor icon representing said tool on a remote computer system without an associated shadow only while said tool is selected and active on a local computer system.

3. The apparatus of claim 1 wherein said computer system includes a cursor control device and wherein said cursor icon is responsive to said cursor control device.

4. The apparatus of claim 3 wherein said computer system includes a signal generation device, said selection device responsive to said cursor control device and said signal generation device.

5. The apparatus of claim 3 wherein said computer system includes a signal generation device, said activation mechanism responsive to said cursor control device and said signal generation device.

6. The apparatus of claim 1 wherein said computer system includes a signal generation device, said cursor icon being associated with said shadow only while said signal generation device is inactive.

7. The apparatus of claim 1 wherein said computer system includes a signal generation device, said cursor icon being re-displayed without said associated shadow only while said signal generation device is active.

8. In a computer conferencing system including a first computer system coupled to a second computer system via a communication medium, said first computer system having a first display, a first control device, and a first signal generation device, said second computer system having a second display, an apparatus for manipulating a remote cursor comprising:

a selection device configured to select a remote cursor tool using said first cursor control device and said first signal generation device, said remote cursor tool being a computer implemented function represented by an icon;

a display device configured to display said icon representing said remote cursor tool with an associated shadow only on said first display and only while said tool is selected and inactive; and an activation mechanism configured to activate said remote cursor tool using said first cursor control device and said first signal generation device, wherein said display device re-displays said remote cursor tool without an associated shadow on both said first display and said second display only while said tool is selected and active, said icon being displayed on said second display in a position corresponding to a position of said icon on said first display.

9. The apparatus of claim 8 wherein said first display further includes a public display area, said display device only displays said icon on said second display if said icon is positioned within said public display area of said first display.

10. A computer software product including a medium readable by a processor, the medium having stored thereon:
- a first sequence of instructions which, when executed by the processor, causes the processor to select a tool, wherein the tool is a computer-implemented function represented by an icon;
- a second sequence of instructions which, when executed by the processor, causes the processor to display said icon as a cursor, wherein said cursor icon includes an associated shadow only while said tool is selected and inactive;
- a third sequence of instructions which, when executed by the processor, causes the processor to activate said tool to perform said function; and
- a fourth sequence of instructions which, when executed by the processor, causes the processor to re-display said cursor icon without an associated shadow only while said tool is selected and active.

11. The computer software product of claim 10 further including a fifth sequence of instructions which, when executed by the processor, causes the processor to display the cursor icon representing said tool on a remote computer system without an associated shadow only while said tool is selected and active on a local computer system.

12. The computer software product of claim 10 wherein said first sequence of instructions is executed in response to a cursor control device and a signal generation device.

13. The computer software product of claim 10 wherein said third sequence of instructions is executed in response to a cursor control device and a signal generation device.

* * * * *